United States Patent
Morimoto

(10) Patent No.: US 12,511,493 B2
(45) Date of Patent: Dec. 30, 2025

(54) METHOD, SYSTEM AND DEVICE FOR GENERATING ANSWER TO QUESTION ABOUT ANALYSIS DEVICE

(71) Applicant: Shimadzu Corporation, Kyoto (JP)

(72) Inventor: Kentaro Morimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 399 days.

(21) Appl. No.: 18/008,768

(22) PCT Filed: Mar. 5, 2021

(86) PCT No.: PCT/JP2021/008585
§ 371 (c)(1),
(2) Date: Jun. 19, 2023

(87) PCT Pub. No.: WO2021/250954
PCT Pub. Date: Dec. 16, 2021

(65) Prior Publication Data
US 2023/0325607 A1      Oct. 12, 2023

(30) Foreign Application Priority Data

Jun. 11, 2020 (JP) ................................ 2020-101522

(51) Int. Cl.
*G06F 40/40* (2020.01)
*G06F 16/3329* (2025.01)

(52) U.S. Cl.
CPC .......... *G06F 40/40* (2020.01); *G06F 16/3329* (2019.01)

(58) Field of Classification Search
CPC ............................ G06F 40/40; G06F 16/3329
See application file for complete search history.

(56) References Cited

U.S. PATENT DOCUMENTS

| 6,584,430 B1* | 6/2003 | Rosenbaum | G16Z 99/00 702/183 |
| 2016/0132590 A1* | 5/2016 | Byron | G06F 16/3344 707/722 |

(Continued)

FOREIGN PATENT DOCUMENTS

| CN | 106227190 A | 12/2016 |
| CN | 107169105 A | 9/2017 |

(Continued)

OTHER PUBLICATIONS

Knowledge Discovery, CEATEC Oct. 15, 2019.

(Continued)

*Primary Examiner* — Sonia L Gay
(74) *Attorney, Agent, or Firm* — Muir Patent Law, PLLC

(57) ABSTRACT

An appropriate answer to a question about an analysis device is automatically provided. A system generates an answer to a question about an analysis device. The system includes: a terminal device; and a server device. The terminal device receives an input of the question. The server device receives the question from the terminal device and transmits the answer to the terminal device. The server device includes an inference unit. The inference unit infers the answer from the question by using a trained answer inferring model that can generate a distributed representation of a specific natural language corresponding to manual data including a procedure about the analysis device. The trained answer inferring model is generated by machine learning that uses the manual data and question-answer data, the question-answer data being a combination of questions and answers about the analysis device.

8 Claims, 9 Drawing Sheets

(56) References Cited

U.S. PATENT DOCUMENTS

2017/0154626 A1* 6/2017 Kim .................... G10L 15/22
2021/0256018 A1   8/2021 Nishida et al.
2021/0303990 A1* 9/2021 Oltramari ............. G06N 3/042
2022/0358361 A1* 11/2022 Otsuka ................. G06F 40/56

FOREIGN PATENT DOCUMENTS

| | | |
|---|---|---|
| CN | 109739958 A | 5/2019 |
| CN | 109753558 A | 5/2019 |
| CN | 110532265 A | 12/2019 |
| CN | 110532369 A | 12/2019 |
| JP | 2003-099439 A | 4/2003 |
| JP | 2003-115010 A | 4/2003 |
| JP | 2006-72787 | 3/2006 |
| JP | 2008-293534 A | 12/2008 |
| JP | 2019-125220 A | 7/2019 |
| JP | 2019-191827 A | 10/2019 |

OTHER PUBLICATIONS

PCT Written Opinion of the International Searching Authority for PCT application No. PCT/JP2021/008585, dated May 18, 2021.
Notice of Reasons for Refusal for corresponding Japanese Patent Application No. 2022-530029 dated Jan. 30, 2024.
Chinese Office Action dated Nov. 8, 2025 for corresponding application No. 202180041100.7.

* cited by examiner

FIG.4

| TRAINING DATA | PROCEDURE ABOUT LIQUID CHROMATOGRAPH | CORRECT ANSWER DATA | |
|---|---|---|---|
| | | QUESTION | ANSWER |
| Sd1 | ATTACH COLUMN TO COLUMN OVEN. 1. STOP LIQUID DELIVERY. 2. OPEN DOOR OF COLUMN OVEN. 3. ATTACH COLUMN TO COLUMN CLAMP WITH OUTLET SIDE OF COLUMN FACING UPWARD. 4. CLOSE DOOR OF COLUMN OVEN. | HOW CAN I ATTACH COLUMN? | STOP LIQUID DELIVERY, OPEN DOOR OF COLUMN OVEN, AND ATTACH COLUMN TO COLUMN CLAMP WITH OUTLET SIDE OF COLUMN FACING UPWARD. THEN, CLOSE DOOR OF COLUMN OVEN. |
| Sd2 | PREPARE SAMPLE BOTTLE. 1. COMPLETELY DISSOLVE SAMPLE IN SOLVENT EQUIVALENT IN COMPOSITION TO MOBILE PHASE. 2. FILTER SAMPLE BY MEMBRANE FILTER. 3. FILL SAMPLE INTO SAMPLE BOTTLE OR WELL OF MICROPLATE OR DEEP WELL PLATE. | HOW CAN I PREPARE SAMPLE BOTTLE? | COMPLETELY DISSOLVE SAMPLE IN SOLVENT EQUIVALENT IN COMPOSITION TO MOBILE PHASE. FILTER SAMPLE BY MEMBRANE FILTER. FILL SAMPLE INTO SAMPLE BOTTLE OR WELL OF MICROPLATE OR DEEP WELL PLATE. |
| Sd3 | PUT SAMPLE INTO AUTOSAMPLER. 1. PULL OUT SAMPLE RACK. 2. PUT SAMPLE PLATE FILLED WITH SAMPLE INTO SAMPLE RACK. 3. HORIZONTALLY INSERT SAMPLE RACK DEEPLY ALONG GUIDE. | I DON'T KNOW A PROCEDURE FOR PUTTING SAMPLE INTO AUTOSAMPLER. | PULL OUT SAMPLE RACK. PUT SAMPLE PLATE FILLED WITH SAMPLE INTO SAMPLE RACK. HORIZONTALLY INSERT SAMPLE RACK DEEPLY ALONG GUIDE. |

METHOD, SYSTEM AND DEVICE FOR GENERATING ANSWER TO QUESTION ABOUT ANALYSIS DEVICE

TECHNICAL FIELD

The present invention relates to a method, a system and a device for generating an answer to a question about an analysis device.

BACKGROUND ART

There has been conventionally known a configuration that searches for information about a device required by a user from a manual of the device. For example, Japanese Patent Laying-Open No. 2019-125220 (PTL 1) discloses a manual search system that searches for a setting of a phone from manual data of the phone by using a search word input from a search terminal. According to the manual search system, the relevance between settings of a plurality of phones is learned and score values of the settings are calculated, and thus, the number of times of searches when searching for the series of settings can be reduced and the time and effort required for search by a user can be reduced.

CITATION LIST

Patent Literature

PTL 1: Japanese Patent Laying-Open No. 2019-125220

SUMMARY OF INVENTION

Technical Problem

In order to achieve precision analysis by an analysis device, many procedures are often required. Therefore, manual data of the analysis device may include enormous information. However, since the procedures included in the manual data are often procedures in a common situation, information about a situation that a user wants to solve is not necessarily aggregated into the manual data.

When the user cannot find desired information from the manual data of the analysis device, the user may refer to question-answer collection data (e.g., frequently asked questions (FAQ)), which is a collection of combinations (question-answer data) of questions actually asked by various users and answers to the questions. However, since an answer obtained from the question-answer collection data in response to a question is often fragmentary, the user needs to repeatedly search for the manual data and the question-answer collection data in order to obtain the desired information.

When the manual data of the analysis device and the question-answer collection data include enormous information, spelling inconsistency (inconsistency in terms used in the same meaning) is likely to occur in each of the manual data of the analysis device and the question-answer collection data, and between the manual data of the analysis device and the question-answer collection data. Therefore, the user needs to search for the desired information by using various search keywords. As a result, efficient obtainment of the desired information may become difficult.

The present invention has been made to solve the above-described problem, and an object thereof is to automatically provide an answer corresponding to a question about an analysis device.

Solution to Problem

A method according to an aspect of the present invention is for generating an answer to a question about an analysis device. The method includes: receiving, by a computer, an input of the question; inferring the answer from the question by using a trained answer inferring model that can generate a distributed representation of a specific natural language corresponding to manual data including a procedure about the analysis device; and outputting the answer. The trained answer inferring model is generated by machine learning that uses the manual data and question-answer data, the question-answer data being a combination of questions and answers about the analysis device.

A system according to another aspect of the present invention is for generating an answer to a question about an analysis device. The system includes: a terminal device; and a server device. The terminal device receives an input of the question. The server device receives the question from the terminal device and transmits the answer to the terminal device. The server device includes an inference unit. The inference unit infers the answer from the question by using a trained answer inferring model that can generate a distributed representation of a specific natural language corresponding to manual data including a procedure about the analysis device. The trained answer inferring model is generated by machine learning that uses the manual data and question-answer data, the question-answer data being a combination of questions and answers about the analysis device.

A device according to another aspect of the present invention is for generating an answer to a question about an analysis device. The device includes: an input-output unit; and an inference unit. The input-output unit receives an input of the question. The inference unit infers the answer from the question by using a trained answer inferring model that can generate a distributed representation of a specific natural language corresponding to manual data including a procedure about the analysis device, and outputs the answer to the input-output unit. The trained answer inferring model is generated by machine learning that uses the manual data and question-answer data, the question-answer data being a combination of questions and answers about the analysis device.

Advantageous Effects of Invention

In the method, the system and the device according to the present invention, it is possible to automatically provide an answer corresponding to a question about an analysis device, by using the trained answer inferring model generated by machine learning that uses the manual data and the question-answer data.

BRIEF DESCRIPTION OF DRAWINGS

FIG. 4 shows an example of training data used in fine tuning of a conversion model.

DESCRIPTION OF EMBODIMENTS

Figure 1:
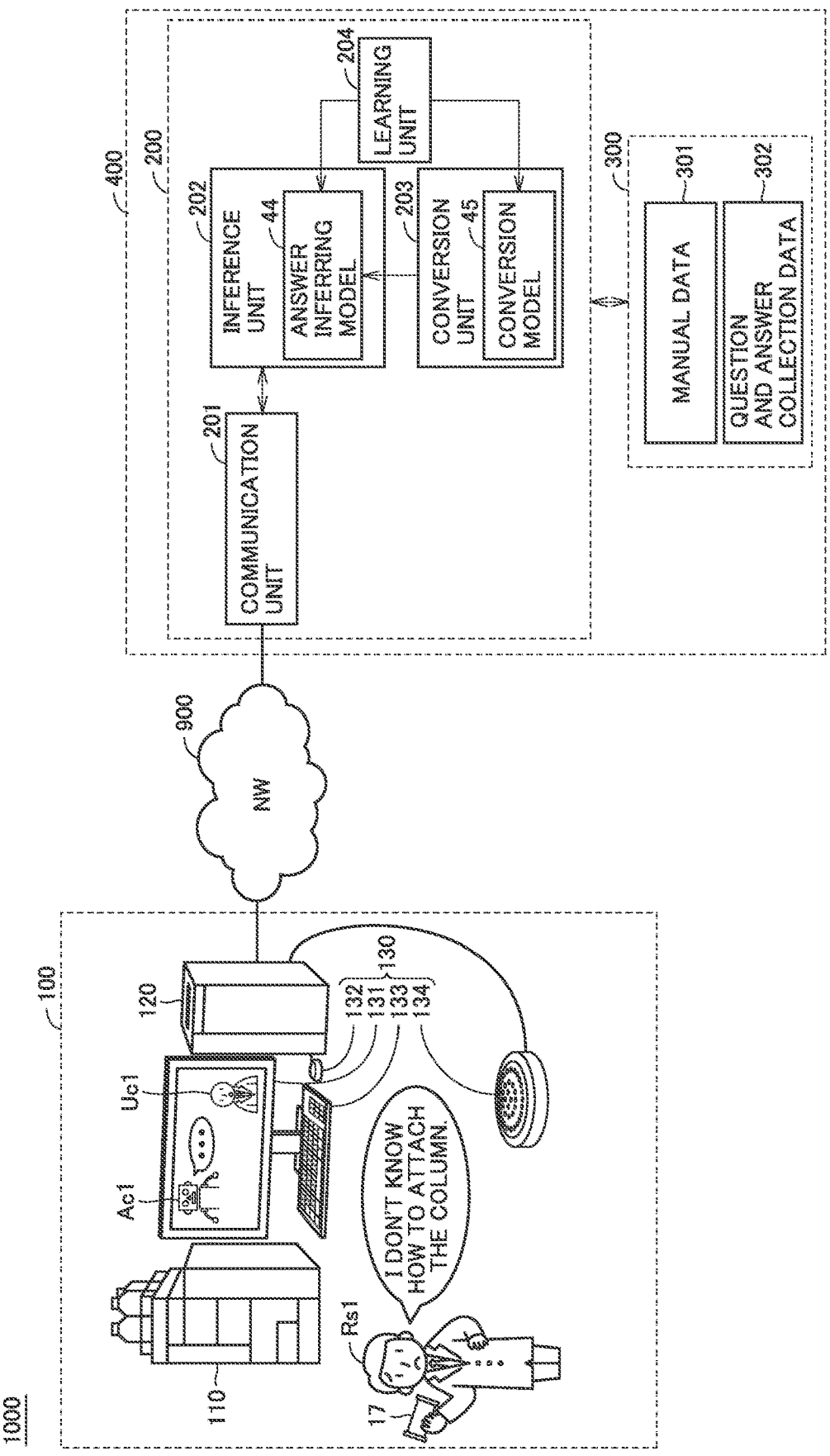
FIG. 1 is a block diagram showing a configuration of an analysis device management system that is one example of a system according to an embodiment.

An embodiment will be described in detail hereinafter with reference to the drawings, in which the same or corresponding portions are denoted by the same reference characters and description thereof will not be repeated in principle.

FIG. 1 is a block diagram showing a configuration of an analysis device management system 1000 that is one example of a system according to an embodiment. As shown in FIG. 1, analysis device management system 1000 includes a liquid chromatograph (LC) analysis system 100 and an analysis device management server 400. LC analysis system 100 includes a liquid chromatograph 110 (analysis device), an information processing device 120 (terminal device), and an input-output unit 130. Analysis device management server 400 includes a server device 200 and a database 300.

Information processing device 120 includes a personal computer or a workstation. Information processing device 120 is connected to server device 200 through a network NW. Network NW includes, for example, the Internet, a wan area network (WAN) or a lan area network (LAN). Information processing device 120 is connected to liquid chromatograph 110. An LC analysis application that performs control of liquid chromatograph 110 and communication with server device 200 is installed on information processing device 120. A user Rs1 operates liquid chromatograph 110 through the LC analysis application. A plurality of liquid chromatographs 110 may be connected to information processing device 120. An analysis device (e.g., mass spectrometer) other than the liquid chromatograph may be connected to information processing device 120. In addition, a plurality of analysis systems may be connected to analysis device management server 400. The analysis device managed by analysis device management server 400 is not limited to the liquid chromatograph and may be, for example, a mass spectrometer.

Database 300 includes manual data 301 of liquid chromatograph 110 and question-answer collection data 302 of liquid chromatograph 110. Manual data 301 includes a procedure about liquid chromatograph 110. The procedure includes a plurality of ordered operations about liquid chromatograph 110. Question-answer collection data 302 includes FAQ, which is a collection of contents actually asked by various users of liquid chromatograph 110. User Rs1 can refer to and search for manual data 301 and question-answer collection data 302 through the LC analysis application. Database 300 may be formed in server device 200, or may be connected to server device 200 through network NW.

Figure 2:
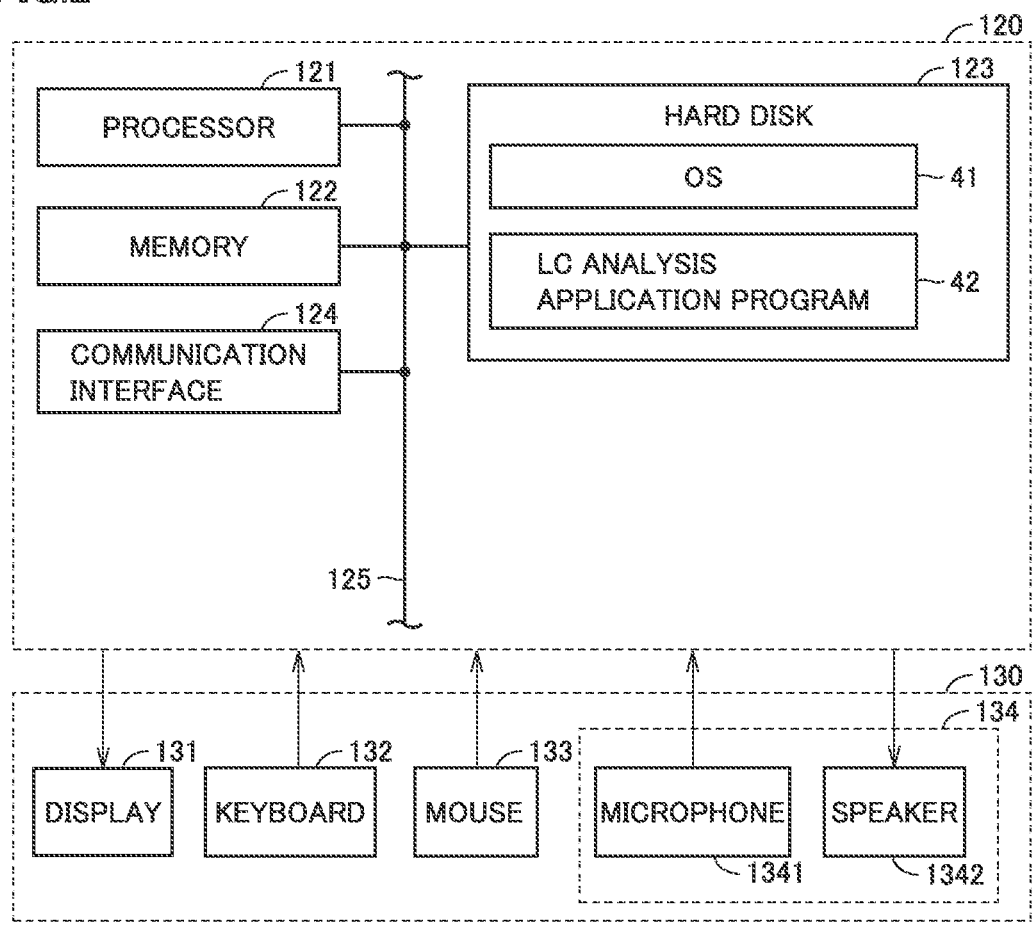
FIG. 2 is a block diagram showing hardware configurations of an information processing device and an input-output unit in FIG. 1.

FIG. 2 is a block diagram showing hardware configurations of information processing device 120 and input-output unit 130 in FIG. 1. As shown in FIG. 2, information processing device 120 includes a processor 121, a memory 122 and a hard disk 123 as a storage unit, and a communication interface 124. These are communicably connected to each other through a bus 125.

Hard disk 123 is a nonvolatile storage device. A program 41 of an operating system (OS) and a program 42 of the LC analysis application are, for example, stored in hard disk 123. In addition to the data shown in FIG. 2, settings and outputs of various applications, and detection data from a detector 18 are, for example, stored in hard disk 123. Memory 122 is a volatile storage device and includes, for example, a dynamic random access memory (DRAM).

Processor 121 includes a central processing unit (CPU). Processor 121 may further include a graphics processing unit (GPU). Processor 121 reads a program stored in hard disk 123 into memory 122 and executes the program. Processor 121 connects to network NW through communication interface 124.

Input-output unit 130 includes a display 131, a mouse 132, a keyboard 133, and a speakerphone 134. Speakerphone 134 includes a microphone 1341 and a speaker 1342. Each of display 131, mouse 132, keyboard 133, and speakerphone 134 is connected to information processing device 120. A graphical user interface (GUI) of the LC analysis application is displayed on display 131. User Rs1 provides a desired input to the LC analysis application through operation of keyboard 133, operation of mouse 132, or voice input to speakerphone 134, while referring to displaying of display 131. The LC analysis application can output voice through speakerphone 134.

Figure 3:
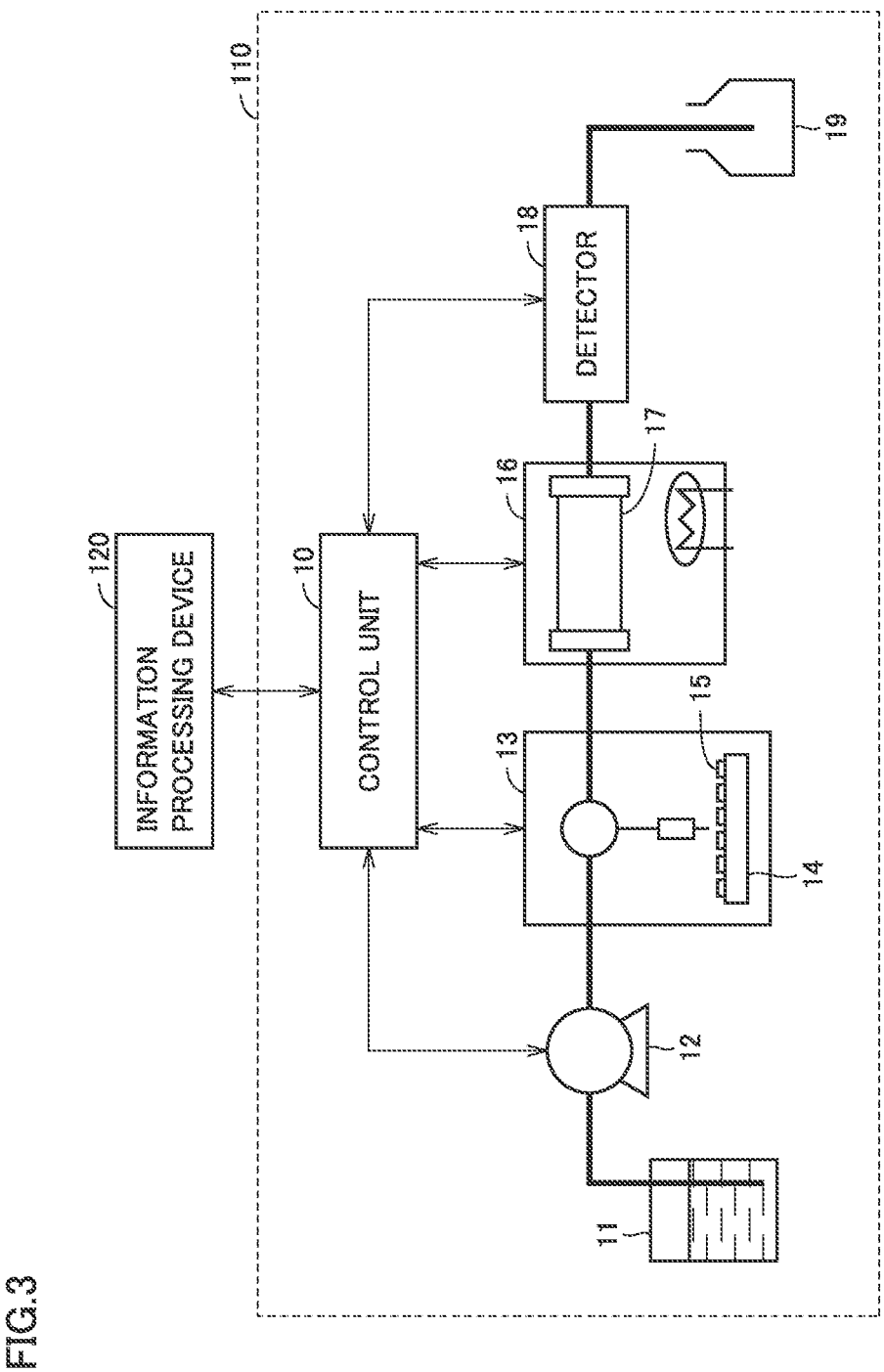
FIG. 3 is a block diagram showing a configuration of a liquid chromatograph in FIG. 1.

FIG. 3 is a block diagram showing a configuration of liquid chromatograph 110 in FIG. 1. As shown in FIG. 3, liquid chromatograph 110 includes a control unit 10, an eluent (mobile phase) tank 11, a liquid delivery pump 12, an autosampler 13, a column oven 16, a detector 18, and a collector 19. A sample rack 14 on which a plurality of vial bottles 15 are mounted is placed in autosampler 13. A column 17 is placed in column oven 16. Information processing device 120 controls each of liquid delivery pump 12, autosampler 13, column oven 16, and detector 18 through control unit 10, to manage analysis work by liquid chromatograph 110, analyze the data obtained in detector 18, and the like.

Liquid delivery pump 12 suctions an eluent from eluent tank 11 at a substantially constant flow rate and causes the eluent to flow to column 17 through autosampler 13. In autosampler 13, a sample solution in vial bottles 15 subjected to pretreatment is injected into the eluent. The sample solution is introduced into column 17 together with the eluent. Since a time period (keeping time period) during which each of a plurality of components in the sample solution passes through column 17 differs for each component, each component in the sample solution is temporally separated during the passage through column 17. Detector 18 sequentially detects the components separated and eluted by column 17, and transmits detected data to information processing device 120 through control unit 10. The eluent flowing out from detector 18 is discharged to collector 19. The eluent flowing out from detector 18 may be input to another analysis device (e.g., mass spectrometer).

In order to achieve precision analysis by liquid chromatograph 110, many procedures are often required. Therefore, manual data 301 of liquid chromatograph 110 includes enormous information. However, since the procedures included in manual data 301 are often procedures in a common situation, information about a situation that user Rs1 wants to solve is not necessarily aggregated into manual data 301.

Examples of an analysis method enabled by liquid chromatograph 110 can include ion chromatography in which ion species components in a sample solution are separated and quantified. The ion chromatography is an analysis method that is developed for measurement of inorganic ions in environmental water and is applicable to water quality management of environmental water, drainage or the like, atmospheric environment measurement, and quality management in the food field and the like. There are many types of ions to be analyzed by the ion chromatography, and in addition to this, the ion chromatography also requires pretreatment. Therefore, the ion chromatography cannot be performed by liquid chromatograph 110, simply by referring to manual data 301 of liquid chromatograph 110 and learning how to operate liquid chromatograph 110.

When user Rs1 cannot find desired information from manual data 301 of liquid chromatograph 110, user Rs1 may refer to question-answer collection data 302. However, since an answer obtained from question-answer collection data 302 in response to a question is often fragmentary, user Rs1 needs to repeatedly search for manual data 301 and question-answer collection data 302 in order to obtain the desired information.

When manual data 301 and question-answer collection data 302 include enormous information, spelling inconsistency is likely to occur in each of manual data 301 and question-answer collection data 302, and between manual data 301 of liquid chromatograph 110 and question-answer collection data 302. Therefore, user Rs1 needs to search for the desired information by using various search keywords. As a result, efficient obtainment of the desired information may become difficult.

Accordingly, in analysis device management system 1000, an appropriate answer to a question input from user Rs1 is inferred by using a trained answer inferring model generated by machine learning that uses manual data 301 and question-answer collection data 302. According to analysis device management system 1000, user Rs1 does not need to assume spelling inconsistency about contents of questions, and can automatically obtain an answer including desired information, by using a question generated by terms that are easy to use for user Rs1.

Referring again to FIG. 1, the LC analysis application has the function of generating an answer to a question about liquid chromatograph 110 (question and answer function). Characters Ac1 and Uc1, which are GUIs about the question and answer function of the LC analysis application, are displayed on display 131. Character Ac1 corresponds to an artificial intelligence (AI) assistant implemented by server device 200. Character Uc1 corresponds to user Rs1. User Rs1 inputs a question about liquid chromatograph 110, "I don't know how to attach the column", to speakerphone 134 by voice. The question may be input from keyboard 133 by characters. Information processing device 120 receives the input of the question and transmits the question to server device 200 through network NW.

Server device 200 includes a communication unit 201, an inference unit 202, a conversion unit 203, and a learning unit 204. Inference unit 202 infers an answer corresponding to the question from the question received from information processing device 120 by using an answer inferring model 44, and transmits the answer to information processing device 120 through communication unit 201. Conversion unit 203 converts a procedure about liquid chromatograph 110 included in manual data 301 into question-answer data corresponding to the procedure by using a conversion model 45. Answer inferring model 44 and conversion model 45 are preliminarily prepared. Specifically, each of answer inferring model 44 and conversion model 45 includes a specific model obtained by preliminary learning of a distributed representation (vector representation) of a specific natural language corresponding to manual data 301, and is formed as a neural network. The specific natural language corresponding to manual data 301 is a natural language used to represent the information included in manual data 301. Since the specific model is preliminarily learned, the cost required for machine learning performed on answer inferring model 44 and conversion model 45 can be reduced and the accuracy of inference of answer inferring model 44 can be enhanced.

In the preliminary learning of the specific model, a corpus, which is language data composed of a large amount of organized document data of the specific natural language, is used. The corpus does not need to include the information about the liquid chromatograph such as manual data 301 and question-answer collection data 302. Examples of the specific model can include a bidirectional encoder representations from transformers (BERT) model, a continuous bag-of-words (CBOW) model or a skip-gram model.

Each of answer inferring model 44 and conversion model 45 is a trained model generated by additional learning and fine tuning of the specific model. By the additional learning of the specific model, a vocabulary tendency of the specific natural language included in the manual data and the question-answer data can be reflected in the distributed representation generated by the specific model, and thus, the accuracy of inference of answer inferring model 44 can be further enhanced. In addition, by the fine tuning of the specific model, the accuracy of inference of answer inferring model 44 can be further enhanced.

Learning unit 204 performs the additional learning and the fine tuning on each of answer inferring model 44 and conversion model 45 through natural language processing including morphological analysis, and transforms each of answer inferring model 44 and conversion model 45 into a trained model. In the additional learning, learning unit 204 performs unsupervised learning that uses manual data 301 and question-answer collection data 302. The morphological analysis refers to a process of dividing document data into a minimum linguistic unit (a morpheme or a word).

In the fine tuning of conversion model 45, by using training data in which the procedure included in manual data 301 and the question-answer data corresponding to the procedure are associated with each other, learning unit 204 performs supervised learning, with the procedure in the training data being used as an input of conversion model 45 and the question-answer data in the training data being used as ground truth of an output of conversion model 45. The training data is preliminarily prepared. The training data may be created automatically, or may be created manually.

In the fine tuning of answer inferring model 44, learning unit 204 performs supervised learning, with the question included in the question-answer data output from conversion unit 203 being used as an input of answer inferring model 44 and the answer included in the question-answer data being used as ground truth of an output of answer inferring model 44. In the fine tuning of answer inferring model 44, question-answer collection data 302 may be used in addition to the output from conversion model 45. Alternatively, in the fine tuning, question-answer collection data 302 may be used instead of the output from conversion model 45. In this case, server device 200 does not need to include conversion unit 203.

FIG. 4 shows an example of the training data used in the fine tuning of conversion model 45. FIG. 4 shows training data Sd1, Sd2 and Sd3. A procedure about liquid chromatograph 110 in each of training data Sd1 to Sd3 may be or may not be included in manual data 301.

As shown in FIG. 4, training data Sd1 includes the procedure about liquid chromatograph 110, "Attach column to column oven". In this procedure, the four operations, "1. Stop liquid delivery", "2. Open door of column oven", "3. Attach column to column clamp with outlet side of column facing upward", and "4. Close door of column oven", are ordered in this order. The question-answer data as ground truth corresponding to the procedure in training data Sd1 is a combination of the question, "How can I attach column?", and the answer, "Stop liquid delivery, open door of column oven, and attach column to column clamp with outlet side of column facing upward. Then, close door of column oven".

Training data Sd2 includes the procedure about liquid chromatograph 110, "Prepare sample bottle". In this procedure, the three operations, "1. Completely dissolve sample in solvent equivalent in composition to mobile phase", "2. Filter sample by membrane filter" and "3. Fill sample into sample bottle, microplate, or well of deep well plate", are ordered in this order. The question-answer data as ground truth corresponding to the procedure in training data Sd2 is a combination of the question, "How can I prepare sample bottle?", and the answer, "Completely dissolve sample in solvent equivalent in composition to mobile phase. Filter sample by membrane filter. Fill sample into sample bottle, microplate, or well of deep well plate".

Training data Sd3 includes the procedure about liquid chromatograph 110, "Put sample into autosampler". In this procedure, the three operations, "1. Pull out sample rack", "2. Put sample plate filled with sample into sample rack" and "3. Horizontally insert sample rack deeply along guide", are ordered in this order. The question-answer data as ground truth corresponding to the procedure in training data Sd3 is a combination of the question, "I don't know a procedure for putting sample into autosampler", and the answer, "Pull out sample rack. Put sample plate filled with sample into sample rack. Horizontally insert sample rack deeply along guide".

Figure 5:
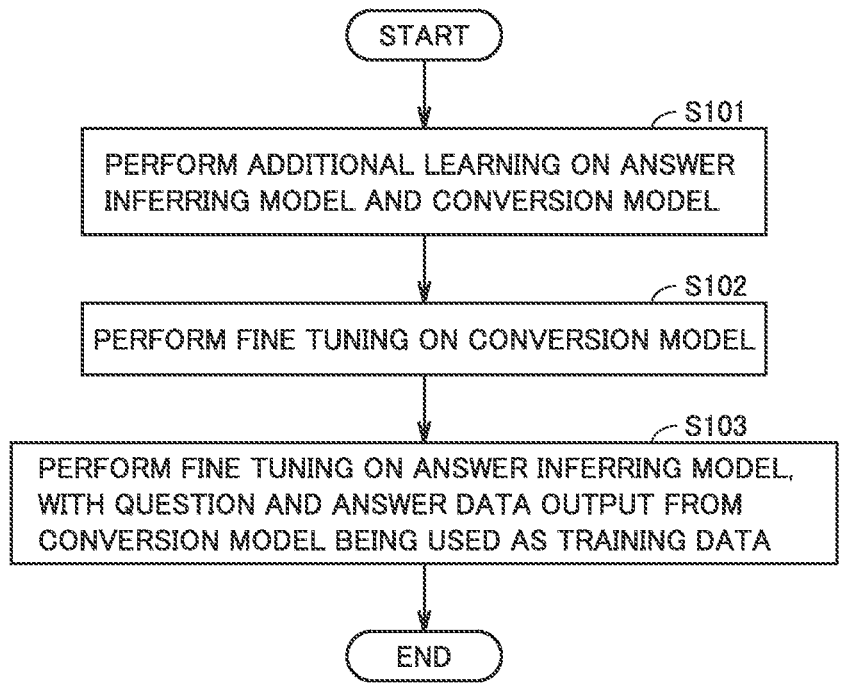
FIG. 5 is a flowchart showing a flow of a learning process performed by a learning unit in FIG. 1.

FIG. 5 is a flowchart showing a flow of a learning process performed by learning unit 204 in FIG. 1. In the following description, the step will be simply denoted as "S".

As shown in FIG. 5, in S101, learning unit 204 performs additional learning on answer inferring model 44 and conversion model 45 and the process proceeds to S102. In S102, learning unit 204 performs fine tuning on conversion model 45 and the process proceeds to S103. In S103, learning unit 204 performs fine tuning on the answer inferring model, with the question-answer data output from conversion model 45 being used as training data, and the learning process ends. The additional learning in S101 does not necessarily need to be performed and the learning process may be started from S102.

Figure 6:
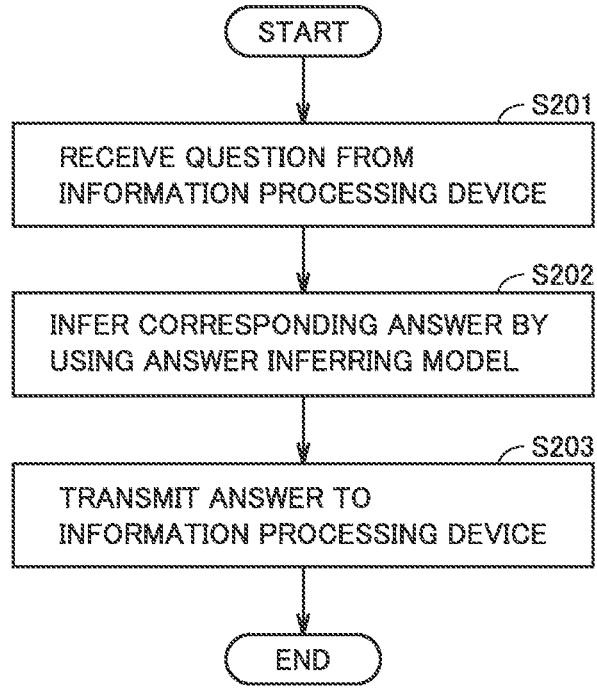
FIG. 6 is a flowchart showing a flow of an inference process performed in an inference unit.

FIG. 6 is a flowchart showing a flow of an inference process performed in inference unit 202. As shown in FIG. 6, in S201, inference unit 202 receives a question from information processing device 120 and the process proceeds to S202. In S202, inference unit 202 infers an answer corresponding to the question received from information processing device 120 by using answer inferring model 44 and the process proceeds to S203. In S203, inference unit 202 transmits the inferred answer to information processing device 120 through communication unit 201 and the process ends.

Figure 7:
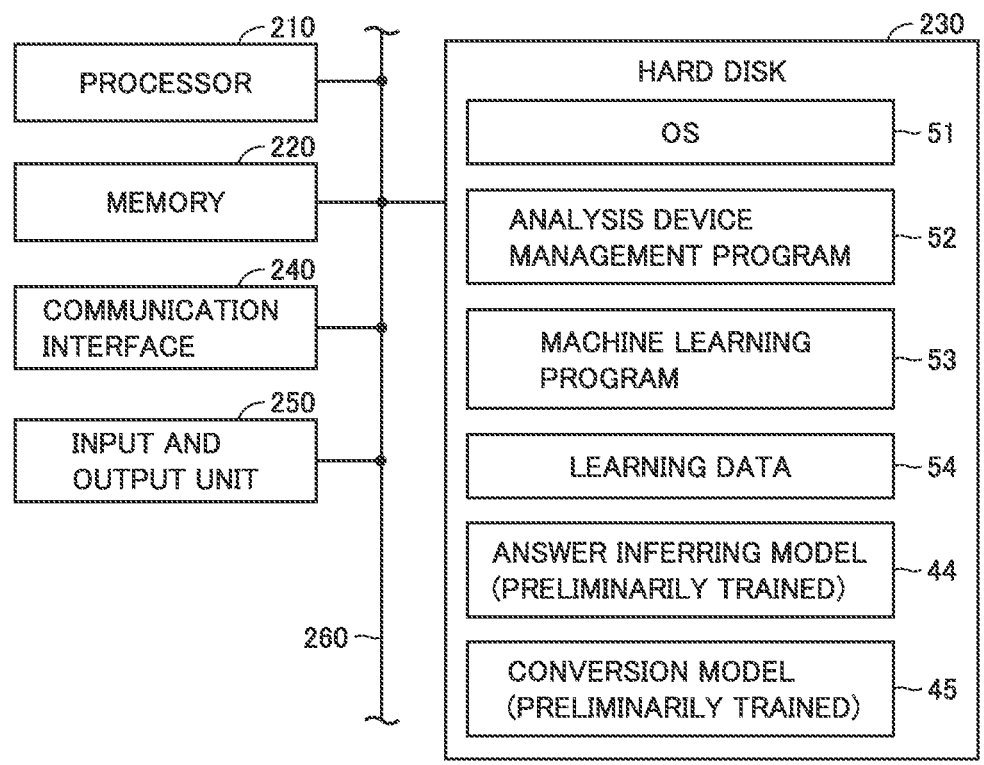
FIG. 7 is a block diagram showing a hardware configuration of a server device in FIG. 1.

FIG. 7 is a block diagram showing a hardware configuration of server device 200 in FIG. 1. As shown in FIG. 7, server device 200 includes a processor 210, a memory 220 and a hard disk 230 as a storage unit, a communication interface 240 as communication unit 201, and an input-output unit 250. These are communicably connected to each other through a bus 260.

Hard disk 230 is a nonvolatile storage device. A program 51 of an operating system (OS), an analysis device management program 52, a machine learning program 53, learning data 54 for machine learning, a preliminarily trained answer inferring model 44, and a preliminarily trained conversion model 45 are, for example, stored in hard disk 230. The training data shown in FIG. 4 is included in learning data 54. In addition to the data shown in FIG. 7, settings and outputs of various applications are, for example, stored in hard disk 230. Memory 220 is a volatile storage device and includes, for example, a dynamic random access memory (DRAM).

Processor 210 includes a central processing unit (CPU). Processor 210 may further include a graphics processing unit (GPU). Processor 210 reads a program stored in hard disk 230 into memory 220 and executes the program, thereby implementing various functions of server device 200. For example, processor 210 that executes analysis device management program 52 functions as inference unit 202. Processor 210 that executes machine learning program 53 functions as conversion unit 203 and learning unit 204. Processor 210 connects to network NW through communication interface 240.

Figure 8:
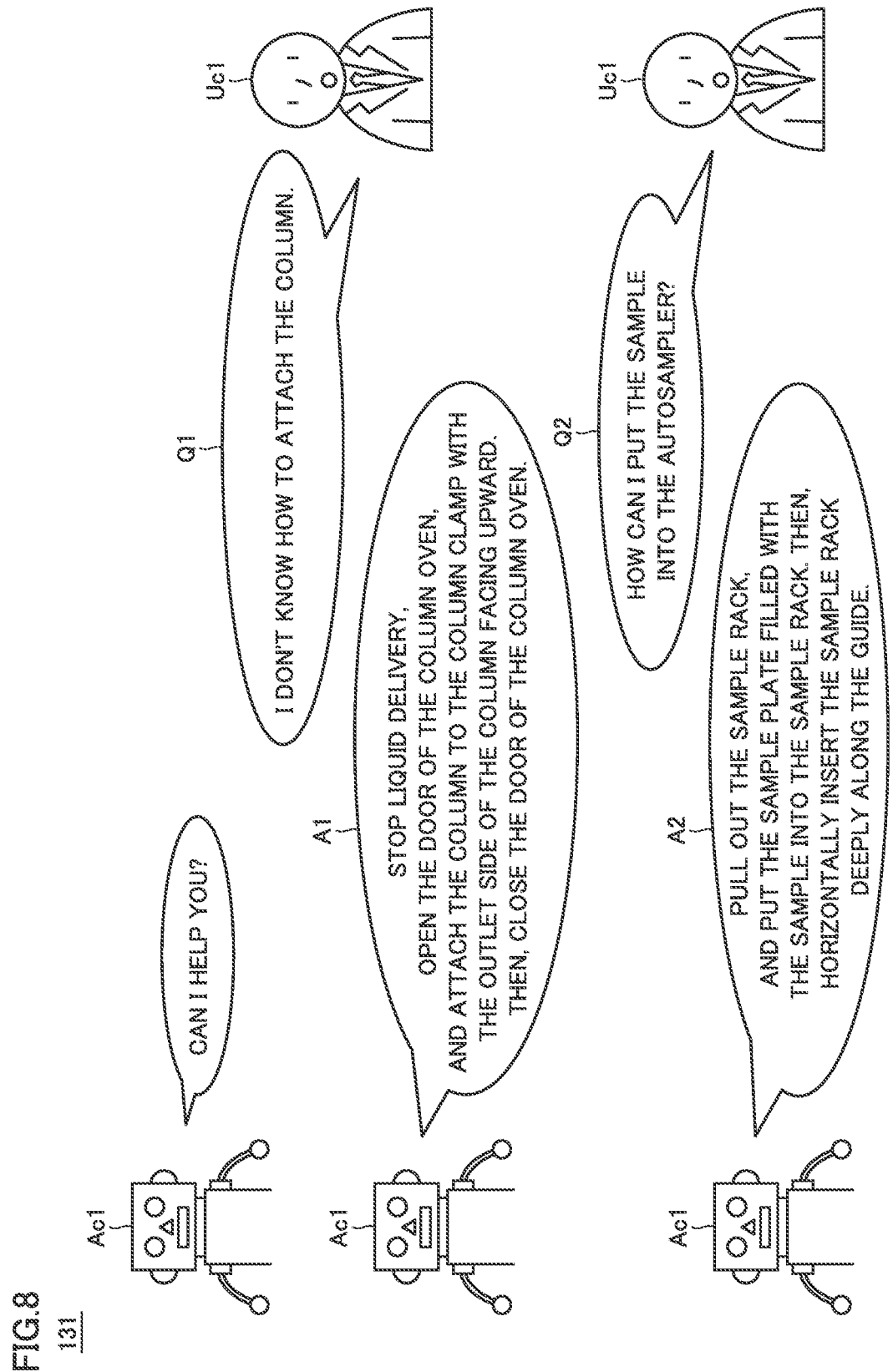
FIG. 8 shows a state in which questions from a user in FIG. 1 and answers corresponding to the questions are displayed on a display.

FIG. 8 shows a state in which questions from user Rs1 in FIG. 1 and answers corresponding to the questions are displayed on display 131. As shown in FIG. 8, a question Q1, "I don't know how to attach the column", is provided from character Uc1 corresponding to user Rs1. Question Q1 corresponds to the question input to speakerphone 134 by user Rs1 by voice in FIG. 1. In response to question Q1, character Ac1 corresponding to the AI assistant provides an answer A1, "Stop liquid delivery, open the door of the column oven, and attach the column to the column clamp with the outlet side of the column facing upward. Then, close the door of the column oven". After answer A1 is provided from character Ac1, a question Q2, "How can I put the sample into the autosampler?", is provided from character Uc1. In response to question Q2, character Ac1 provides an answer A2, "Pull out the sample rack, and put the sample plate filled with the sample into the sample rack. Then, horizontally insert the sample rack deeply along the guide".

Although question Q1 does not match the question in training data Sd1 in FIG. 4, answer A1 similar to the answer in training data Sd1 is inferred as an answer corresponding to question Q1 by using trained answer inferring model 44. Although question Q2 does not match the question in training data Sd3 in FIG. 4, answer A2 similar to the answer in training data Sd3 is inferred as an answer corresponding to question Q2 by using trained answer inferring model 44.

The case in which each of answer inferring model 44 and conversion model 45 includes the specific model that is preliminarily trained by using the corpus that does not include manual data 301 and question-answer collection data 302 has been described in the embodiment. Answer inferring model 44 does not need to include the specific model. When answer inferring model 44 does not include the specific model, answer inferring model 44 and conversion model 45 learn the distributed representation of the specific natural language corresponding to manual data 301 through unsupervised learning that uses manual data 301 and question-answer collection data 302.

The system in which information processing device 120 and server device 200 are connected through network NW, and inference unit 202, conversion unit 203 and learning unit 204 are formed in server device 200 has been described in the embodiment. The inference unit, the conversion unit and the learning unit may be formed in information processing device 120.

Figure 9:
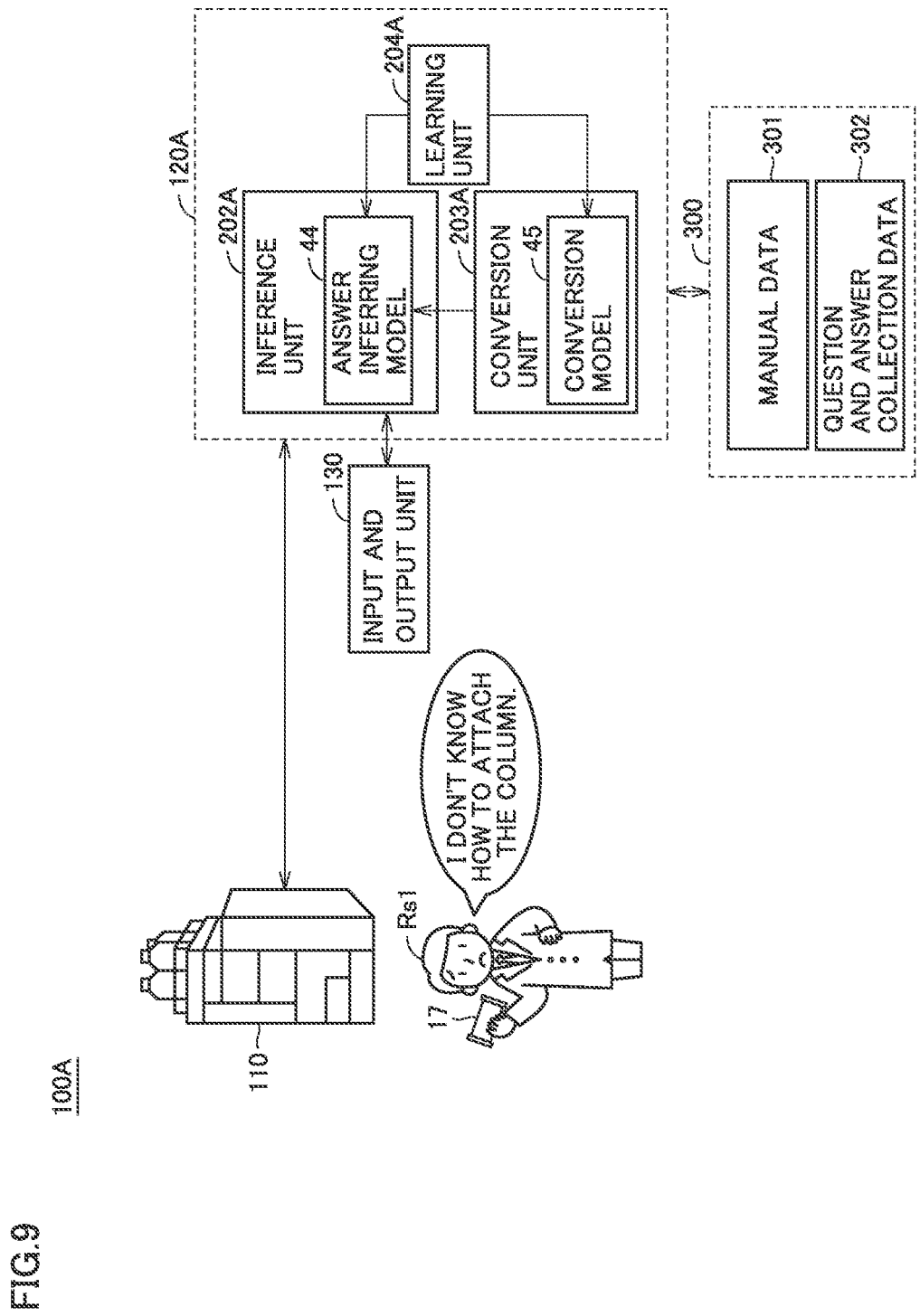
FIG. 9 is a block diagram showing a configuration of an LC analysis system according to a modification of the embodiment.

FIG. 9 is a block diagram showing a configuration of an LC analysis system 100A according to a modification of the embodiment. The configuration of LC analysis system 100A is different in that information processing device 120 in FIG. 1 is replaced with an information processing device 120A and database 300 is connected to information processing device 120A. Since the remaining configuration is the same, description will not be repeated.

As shown in FIG. 9, information processing device 120A includes an inference unit 202A, a conversion unit 203A and a learning unit 204A. In information processing device 120A, input-output unit 130 receives an input of a question from user Rs1. Since inference unit 202A, conversion unit 203A and learning unit 204A have the same functions as those of inference unit 202, conversion unit 203 and learning unit 204 in FIG. 1, respectively, description about these functions will not be repeated.

Figure 10:
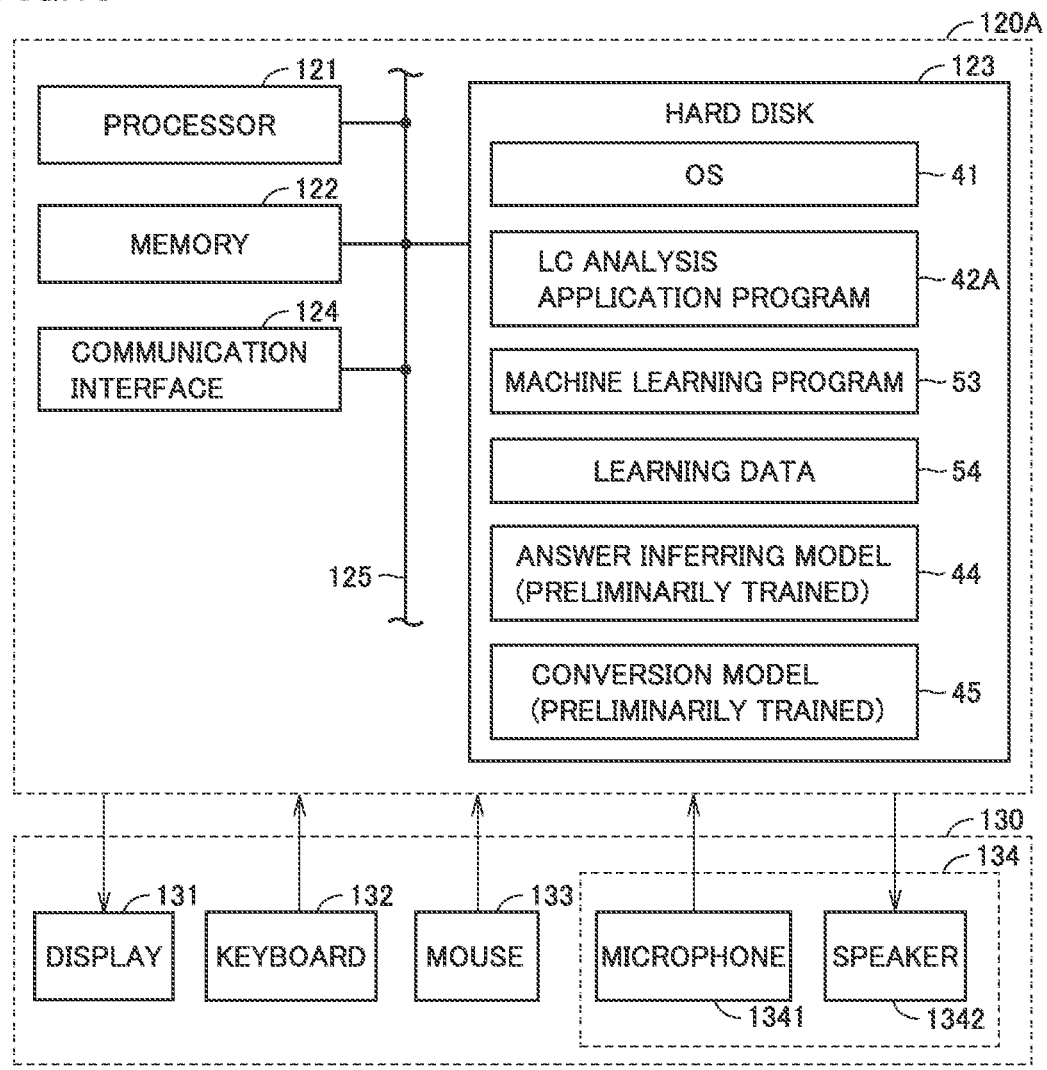
FIG. 10 is a block diagram showing a hardware configuration of an information processing device in FIG. 9.

FIG. 10 is a block diagram showing a hardware configuration of information processing device 120A in FIG. 9. The hardware configuration of information processing device 120A is different in that machine learning program 53, learning data 54, answer inferring model 44, and conversion model 45 in FIG. 7 are added to hard disk 123 in FIG. 2 and LC analysis application program 42 is replaced with an LC analysis application program 42A. Since the remaining configuration is the same, description will not be repeated.

As shown in FIG. 10, processor 121 that executes LC analysis application program 42A functions as inference unit 202A. Processor 121 that executes machine learning program 53 functions as conversion unit 203A and learning unit 204A.

As described above, in the system and the method according to the embodiment and the device according to the modification, it is possible to automatically provide an appropriate answer to a question about an analysis device.

[Aspects]

It is understood by those skilled in the art that the exemplary embodiment described above is a specific example of the following aspects.

(Clause 1) A method according to an aspect is for generating an answer to a question about an analysis device. The method includes: receiving, by a computer, an input of the question; inferring the answer from the question by using a trained answer inferring model that can generate a distributed representation of a specific natural language corresponding to manual data including a procedure about the analysis device; and outputting the answer. The trained answer inferring model is generated by machine learning that uses the manual data and question-answer data, the question-answer data being a combination of questions and answers about the analysis device.

According to the method described in Clause 1, it is possible to automatically provide an answer corresponding to a question about an analysis device, by using the trained answer inferring model generated by machine learning that uses the manual data and the question-answer data.

(Clause 2) The method described in Clause 1 further includes: preparing a conversion model that can generate the distributed representation of the specific natural language and converts the procedure included in the manual data into question-answer data corresponding to the procedure; preparing training data in which the procedure about the analysis device and the question-answer data corresponding to the procedure are associated with each other; performing supervised learning on the conversion model by using the training data, with the procedure in the training data being used as an input of the conversion model and the question-answer data in the training data being used as ground truth of an output of the conversion model; and performing supervised learning on the answer inferring model, with a question included in the question-answer data output from the trained conversion model being used as an input of the answer inferring model and an answer included in the question-answer data being used as ground truth of an output of the answer inferring model.

According to the method described in Clause 2, the accuracy of inference of the answer inferring model can be enhanced by the supervised learning performed on each of the conversion model and the answer inferring model.

(Clause 3) In the method described in Clause 2, each of the conversion model and the answer inferring model includes a specific model obtained by preliminary learning of the distributed representation of the specific natural language. The supervised learning performed on each of the conversion model and the answer inferring model is performed as fine tuning of the specific model.

According to the method described in Clause 3, since the specific model is preliminarily learned, the cost required for machine learning performed on the conversion model and the answer inferring model can be reduced and the accuracy of inference of the answer inferring model can be further enhanced.

(Clause 4) The method described in Clause 3 further includes performing, on the specific model, additional learning that uses the manual data and the question-answer data about the analysis device.

According to the method described in Clause 4, since a vocabulary tendency of the specific natural language included in the manual data and the question-answer data can be reflected in the distributed representation generated by the specific model, the accuracy of inference of the answer inferring model can be further enhanced.

(Clause 5) A system according to an aspect is for generating an answer to a question about an analysis device. The system includes: a terminal device; and a server device. The terminal device receives an input of the question. The server device receives the question from the terminal device and transmits the answer to the terminal device. The server device includes an inference unit. The inference unit infers the answer from the question by using a trained answer inferring model that can generate a distributed representation of a specific natural language corresponding to manual data including a procedure about the analysis device. The trained answer inferring model is generated by machine learning that uses the manual data and question-answer data, the question-answer data being a combination of questions and answers about the analysis device.

According to the system described in Clause 5, it is possible to automatically provide an answer corresponding to a question about an analysis device, by using the trained answer inferring model generated by machine learning that uses the manual data and the question-answer data.

(Clause 6) A device according to an aspect is for generating an answer to a question about an analysis device. The device includes: an input-output unit; and an inference unit. The input-output unit receives an input of the question. The inference unit infers the answer from the question by using a trained answer inferring model that can generate a distributed representation of a specific natural language corresponding to manual data including a procedure about the analysis device, and outputs the answer to the input-output unit. The trained answer inferring model is generated by machine learning that uses the manual data and question-answer data, the question-answer data being a combination of questions and answers about the analysis device.

According to the device described in Clause 6, it is possible to automatically provide an answer corresponding to a question about an analysis device, by using the trained answer inferring model generated by machine learning that uses the manual data and the question-answer data.

As to the above-described embodiment and modification, it is originally intended that the features described in the embodiment, including any combination not mentioned in the specification, may be combined as appropriate within a range that does not cause inconvenience or contradiction.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 control unit; 11 eluent tank; 12 liquid pump; 13 autosampler; 14 sample rack; 15 vial bottle; 16 column oven; 17 column; 18 detector; 19 collector; 42, 42A analysis application program; 44 answer inferring model; 45 conversion model; 52 analysis device management program; 53 machine learning program; 54 learning data; 100, 100A LC analysis system; 110 liquid chromatograph; 120, 120A information processing device; 121, 210 processor; 122, 220 memory; 123, 230 hard disk; 124, 240 communication interface; 125, 260 bus; 130, 250 input-output unit; 131 display; 132 mouse; 133 keyboard; 134 speakerphone; 200 server device; 201 communication unit; 202, 202A inference unit; 203, 203A conversion unit; 204, 204A learning unit; 300 database; 301 manual data; 302 question-answer collection data; 400 analysis device management server; 1000 analysis device management system; 1341 microphone; 1342 speaker; A1, A2 answer; Ac1, Uc1 character; NW network; Q1, Q2 question; Rs1 user; Sd1 to Sd3 training data.

The invention claimed is:

1. A method for generating an answer to a question about an analysis device, the method comprising:
inferring the answer from the question by using a trained answer inferring model that can generate a distributed representation of a specific natural language corresponding to manual data including a procedure about the analysis device;
outputting the answer;
converting the procedure included in the manual data into question-answer data through a distributed representation of the specific natural language corresponding to the procedure; and
generating the trained answer inferring model by supervised learning in which a question included in the converted question-answer data is used as an input of the answer inferring model and an answer included in the question-answer data is used as ground truth of an output of the answer inferring model.

2. A method for generating an answer to a question about an analysis device, the method comprising:
inferring the answer from the question by using a trained answer inferring model that can generate a distributed representation of a specific natural language corresponding to manual data including a procedure about the analysis device;
outputting the answer;
converting procedure included in the manual data into question-answer data corresponding to the procedure; and
generating the trained answer inferring model by supervised learning in which a question included in the converted question answer data is used as an input of the answer inferring model and an answer included in the question answer data is used as ground truth of an output of the answer inferring model;
preparing a conversion model that can generate the distributed representation of the specific natural language and performs conversion into the question-answer data;
preparing training data in which the procedure about the analysis device and the question-answer data corresponding to the procedure are associated with each other; and
performing supervised learning on the conversion model by using the training data, with the procedure in the training data being used as an input of the conversion model and the question-answer data in the training data being used as ground truth of an output of the conversion model, wherein
in the generating the trained answer inferring model, a question included in the question-answer data output from the trained conversion model is used as an input of the answer inferring model.

3. The method according to claim 2, wherein
each of the conversion model and the answer inferring model includes a specific model obtained by preliminary learning of the distributed representation of the specific natural language, and
the supervised learning performed on each of the conversion model and the answer inferring model is performed as fine tuning of the specific model.

4. The method according to claim 3, further comprising performing, on the specific model, additional learning that uses the manual data and the question-answer data about the analysis device.

5. A system for generating an answer to a question about an analysis device, the system comprising:
a terminal device that receives an input of the question; and
a server device that receives the question from the terminal device and transmits the answer to the terminal device, wherein
the server device includes:
a storage unit configured to store at least one program; and
a processor configured to execute the program, wherein the processor is further configured to:
infer the answer from the question by using a trained answer inferring model that can generate a distributed representation of a specific natural language corresponding to manual data including a procedure about the analysis device;

convert the procedure included in the manual data into question-answer data through a distributed representation of the specific natural language corresponding to the procedure; and generate the trained answer inferring model by supervised learning in which a question included in the converted question-answer data is used as an input of the answer inferring model and an answer included in the question-answer data is used as ground truth of an output of the answer inferring model.

6. A device for generating an answer to a question about an analysis device, the device comprising:

a storage unit configured to store at least one program; and a processor configured to execute the program, wherein the processor is further configured to:

infer the answer from the question by using a trained answer inferring model that can generate a distributed representation of a specific natural language corresponding to manual data including a procedure about the analysis device, and output the answer;

convert the procedure included in the manual data into question-answer data through a distributed representation of the specific natural language corresponding to the procedure; and generate the trained answer inferring model by supervised learning in which a question included in the converted question-answer data is used as an input of the answer inferring model and an answer included in the question-answer data is used as ground truth of an output of the answer inferring model.

7. A system for generating an answer to a question about an analysis device, the system comprising:

a terminal device that receives an input of the question; and a server device that receives the question from the terminal device and transmits the answer to the terminal device, wherein the server device includes:

a storage unit configured to store at least one program; and a processor configured to execute the program, wherein the processor is further configured to:

infer the answer from the question by using a trained answer inferring model that can generate a distributed representation of a specific natural language corresponding to manual data including a procedure about the analysis device;

convert the procedure included in the manual data into question-answer data corresponding to the procedure;

generate the trained answer inferring model by supervised learning in which a question included in the converted question-answer data is used as an input of the answer inferring model and an answer included in the question-answer data is used as ground truth of an output of the answer inferring model;

prepare a conversion model that can generate the distributed representation of the specific natural language and perform conversion into the question-answer data;

prepare training data in which the procedure about the analysis device and the question-answer data corresponding to the procedure are associated with each other; and perform supervised learning on the conversion model by using the training data, with the procedure in the training data being used as an input of the conversion model and the question-answer data in the training data being used as ground truth of an output of the conversion model, wherein in the generating the trained answer inferring model, a question included in the question-answer data output from the trained conversion model is used as an input of the answer inferring model.

8. A device for generating an answer to a question about an analysis device, the device comprising:

a storage unit configured to store at least one program; and a processor configured to execute the program, wherein the processor is further configured to:

infer the answer from the question by using a trained answer inferring model that can generate a distributed representation of a specific natural language corresponding to manual data including a procedure about the analysis device, and output the answer;

convert the procedure included in the manual data into question-answer data corresponding to the procedure;

generate the trained answer inferring model by supervised learning in which a question included in the converted question-answer data is used as an input of the answer inferring model and an answer included in the question-answer data is used as ground truth of an output of the answer inferring model;

prepare a conversion model that can generate the distributed representation of the specific natural language and performs conversion into the question-answer data;

prepare training data in which the procedure about the analysis device and the question-answer data corresponding to the procedure are associated with each other; and perform supervised learning on the conversion model by using the training data, with the procedure in the training data being used as an input of the conversion model and the question-answer data in the training data being used as ground truth of an output of the conversion model, wherein in the generating the trained answer inferring model, a question included in the question-answer data output from the trained conversion model is used as an input of the answer inferring model.

* * * * *